April 7, 1925.

C. C. HICKERSON

MIXING VALVE

Filed April 11, 1924

1,532,745

C. C. Hickerson,
INVENTOR

BY Victor J. Evans
ATTORNEY

WITNESS:

Patented Apr. 7, 1925.

1,532,745

UNITED STATES PATENT OFFICE.

CLARENCE C. HICKERSON, OF TULSA, OKLAHOMA.

MIXING VALVE.

Application filed April 11, 1924. Serial No. 705,884.

*To all whom it may concern:*

Be it known that I, CLARENCE C. HICKERSON, a citizen of the United States, residing at Tulsa, in the county of Tulsa and State of Oklahoma, have invented new and useful Improvements in Mixing Valves, of which the following is a specification.

This invention relates to water distribution apparatus, particularly to valves, and has for its object the provision of a novel valve designed particularly for use in connection with shower baths or for other purposes, whereby hot and cold water may be mixed in the desired proportions.

An additional object is the provision of a device of this character which will be simple and inexpensive in manufacture, neat and attractive in appearance, efficient and durable in service and a general improvement in the art.

Figure 1:
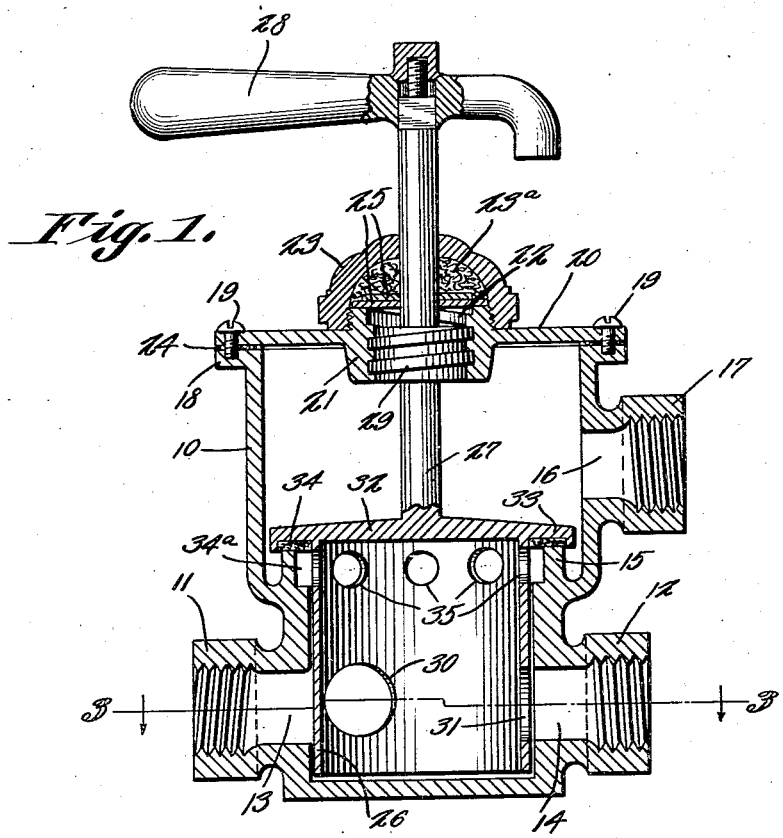
Figure 2:
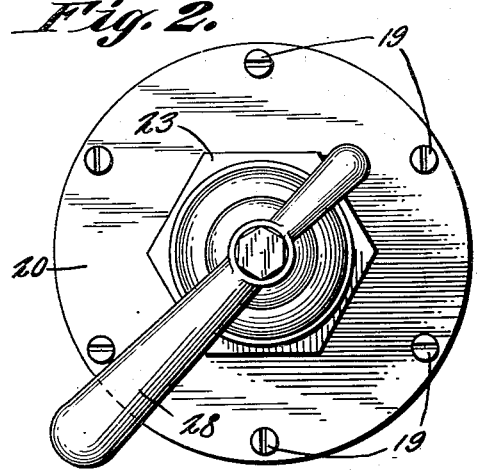
Figure 3:
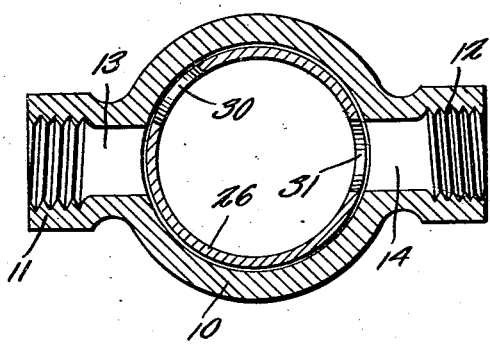

With the above and other objects and advantages in view the invention consists in the details of construction to be hereinafter more fully described and claimed and illustrated in the accompanying drawings, in which:

Figure 1 is a longitudinal section through a valve constructed in accordance with my invention, Figure 2 is a plan view, Figure 3 is a cross section on the line 3—3 of Figure 1.

Referring more particularly to the drawings I have shown the valve as comprising a hollow body 10 formed at its lower portion with oppositely extending branches 11 and 12 to which are connected hot and cold water conduit pipes, not shown. These branches are internally threaded as shown for connection with the pipes therewith. These branches of course communicate with the interior of the body through the ports 13 and 14 respectively. Internally the hollow body is provided at its intermediate portion with an upstanding flange 15 which constitutes a valve seat, and above this flange the body is formed with an outlet port 16 leading into a threaded branch 17 to which an outlet pipe may be connected.

At its upper end the body is formed with an outstanding flange 18 on which is secured, as by screws 19, a cover plate 20 having a central hub portion 21 formed with a thread 22 of steep pitch. The hub extends above the cover plate and is externally threaded for engagement thereon of a cap 23 filled with packing 23ª. It should be mentioned that there is a gasket 24 of suitable material interposed between the flange 18 and the cover to prevent leakage. On the upper end of the hub within the cap 23 are metal washers 25 which prevent the packing in the space above from being compressed against the thread 22.

Rotatably mounted and conformingly fitting within the lower portion of the hollow body is a cylindrical sleeve valve 26 carried by a stem 27 which extends through and beyond the cap 23 and which is equipped with an operating handle 28. The stem 27 carries an enlargement 29 which is threaded for co-operation with the threads 22 so that when the handle is turned, the valve 26 will be moved longitudinally as well as rotatably. The bottom portion of the valve 26 is formed with two openings 30 and 31 adapted to be brought selectively into registration with the ports 13 and 14. The top of the sleeve valve 26 is closed by a wall 32 from which projects an outstanding flange 33 which is channeled and which holds a gasket 34 adapted to seat compressingly upon the flange 15 for cutting off flow of water through the device. Within the confines of the flange 15 is an angular chamber 34ª which communicates with the interior of the sleeve 26 through a plurality of holes 35.

In the operation, it is apparent that, assuming the valve to be closed as shown in Figure 1, to obtain a supply of water it is necessary to turn the handle 28 in a counterclockwise direction, whereupon the co-acting threads will provide longitudinal movement of the valve so that it will disengage the flange 15. At the same time, the opening 30 will be brought partially, and then entirely into registration with the port 13, permitting water to enter the sleeve 26 and pass through the holes 35 into the chamber 34 and out into the body and thence through the outlet branch 17. By properly manipulating the valve, it is apparent that either opening 30 or 31 may be brought into registration with the desired port 13 or 14 so that either hot or cold water alone may be had and it is also obvious that both ports may be caused to register partly with the openings for obtaining any desired proportion of hot and cold water. By turning the handle in a clockwise direction the quick acting thread will cause the flange 33 to reseat upon the flange 15 for cutting off the supply.

While I have shown and described the preferred embodiment of my invention it is of course to be understood that I reserve the right to make such changes in the form, construction and arrangement of parts as will not depart from the spirit of the invention or the scope of the subjoined claim.

I claim:

1. In a device of the character described comprising a hollow body provided in one side near one end with a pair of inlets, and provided near its other end with an outlet, a chamber within the first mentioned end of the body, a flange within the body constituting a valve seat, the internal diameter of the flange being greater than that of the chamber to define an annular space, a cover closing the other end of the body and having a central hub portion formed with a steep thread, a cylindrical sleeve valve rotatable within the chamber and having openings adapted to register selectively with said inlets and having an outstanding flange carrying a gasket adapted to engage upon said seat for cutting off the flow, the valve having a plurality of holes communicating with said annular space, a stem on the valve extending beyond the cover and equipped with a handle, and a threaded enlargement on the rod co-acting with the threaded hub.

In testimony whereof I affix my signature.

CLARENCE C. HICKERSON.